United States Patent
Moral Gonzalez et al.

(10) Patent No.: US 12,352,241 B2
(45) Date of Patent: Jul. 8, 2025

(54) METHOD AND SYSTEM FOR OPTIMIZING POWER OUTPUT OF A WIND TURBINE WITH YAW MISALIGNMENT

(71) Applicant: Siemens Gamesa Renewable Energy Innovation & Technology S.L., Sarriguren (ES)

(72) Inventors: Carlos Moral Gonzalez, Madrid (ES); Felipe Palou Larranaga, Navarra (ES); Juan Jose Pena Martinez, Gondomar (ES); Carlos Pizarro De La Fuente, Madrid (ES); Jaime Suarez Aizpun, Madrid (ES); Jesus Bas Quesada, Madrid (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 0 days.

(21) Appl. No.: 18/274,913

(22) PCT Filed: Jan. 12, 2022

(86) PCT No.: PCT/EP2022/050522
§ 371 (c)(1),
(2) Date: Jul. 28, 2023

(87) PCT Pub. No.: WO2022/167180
PCT Pub. Date: Aug. 11, 2022

(65) Prior Publication Data
US 2024/0093669 A1    Mar. 21, 2024

(30) Foreign Application Priority Data
Feb. 5, 2021    (EP) ..................... 21382095

(51) Int. Cl.
*F03D 7/02*    (2006.01)
*F03D 7/04*    (2006.01)

(52) U.S. Cl.
CPC ........... *F03D 7/0224* (2013.01); *F03D 7/048* (2013.01); *F05B 2270/1032* (2013.01);
(Continued)

(58) Field of Classification Search
CPC ................... F03D 7/0224; F03D 7/048; F05B 2270/1032; F05B 2270/1033;
(Continued)

(56) References Cited

U.S. PATENT DOCUMENTS

| | | | | |
|---|---|---|---|---|
| 5,289,041 A | * | 2/1994 | Holley | F03D 7/0276 290/55 |
| 8,890,349 B1 | * | 11/2014 | Lynch | F03D 7/0204 290/55 |
| 9,303,626 B2 | * | 4/2016 | Kumar | F03D 7/0224 |

(Continued)

FOREIGN PATENT DOCUMENTS

| | | |
|---|---|---|
| EP | 3343025 A1 | 7/2018 |
| WO | 2015048972 A1 | 4/2015 |

OTHER PUBLICATIONS

PCT International Search Report and Written Opinion of International Searching Authority mailed Apr. 28, 2022 corresponding to PCT International Application No. PCT/EP2022/050522 filed Jan. 12, 2022.

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

A system includes a wind turbine a wind and a first control device for controlling the wind turbine. The first control device is configured to acquire a yaw misalignment of the wind turbine, which yaw misalignment is a difference between the actual yaw angle and a wind direction at the wind turbine; and to determine at least one of a target pitch angle of the blade and a target torque of the generator based on the yaw misalignment to optimize a power output from the wind turbine. Further, a wind farm includes the system and a method of controlling a wind turbine.

10 Claims, 2 Drawing Sheets

(52) U.S. Cl.
CPC ............... *F05B 2270/1033* (2013.01); *F05B 2270/32* (2013.01); *F05B 2270/327* (2013.01); *F05B 2270/329* (2013.01); *F05B 2270/708* (2013.01)

(58) Field of Classification Search
CPC ............ F05B 2270/32; F05B 2270/327; F05B 2270/329; F05B 2270/708
See application file for complete search history.

(56) References Cited

U.S. PATENT DOCUMENTS

| | | | |
|---|---|---|---|
| 9,909,565 B2* | 3/2018 | Palomares Rentero | F03D 7/0224 |
| 10,107,262 B2* | 10/2018 | Palomares Rentero | F03D 7/047 |
| 10,794,360 B2* | 10/2020 | Arlaban Gabeiras | F03D 7/024 |
| 2006/0145483 A1* | 7/2006 | Larsen | F03D 7/042 290/44 |
| 2009/0108582 A1* | 4/2009 | Seibers | F03D 7/02 416/37 |
| 2012/0009062 A1* | 1/2012 | Ingram | F03D 7/0224 416/41 |
| 2012/0134807 A1* | 5/2012 | Axelsson | F03D 7/0224 416/1 |
| 2014/0169964 A1* | 6/2014 | Kumar | F03D 7/0204 416/1 |
| 2014/0271187 A1* | 9/2014 | Baker | F03D 7/024 416/37 |
| 2015/0176568 A1* | 6/2015 | Laborda Rubio | F03D 7/0224 416/1 |
| 2015/0345470 A1* | 12/2015 | Palomares Rentero | F03D 7/042 700/287 |
| 2016/0003222 A1* | 1/2016 | Palomares Rentero | F03D 7/047 416/31 |
| 2018/0010576 A1* | 1/2018 | Brake | F03D 7/048 |
| 2023/0012218 A1* | 1/2023 | Al | F03D 17/00 |

* cited by examiner

METHOD AND SYSTEM FOR OPTIMIZING POWER OUTPUT OF A WIND TURBINE WITH YAW MISALIGNMENT

CROSS-REFERENCE TO RELATED APPLICATIONS

This application claims priority to PCT Application No. PCT/EP2022/050522, having a filing date of Jan. 12, 2022, which claims priority to EP Application No. 21382095.4, having a filing date of Feb. 5, 2021, the entire contents both of which are hereby incorporated by reference.

FIELD OF TECHNOLOGY

The following relates to a system comprising a wind turbine and a first control device which controls the wind turbine based on a yaw misalignment. The following also relates to a wind farm comprising the system, wherein a plurality of adjacent wind turbines is provided, and to a method of controlling a wind turbine.

BACKGROUND

In a conventional wind farm, wake steering strategies by adjusting wake effects between the wind turbines are performed to increase the annual energy production (AEP) of the wind farm. For example, an upstream wind turbine is set into a yawed condition, i.e., with a yaw misalignment, where a rotational axis of a hub is not fully aligned with the wind direction so as to deflect a wake produced by the upstream wind turbine away from a downstream wind turbine. By minimizing the wake effects, the power output of the wind farm is increased. The yawed conditions can therefore represent a desired yaw misalignment of the respective wind turbines to operate a wind farm controller in an optimum condition. If all wind turbines of the wind farm would be properly aligned in the wind direction, there would be no yaw misalignment, but the entire performance of the wind farm controller will be degraded due to the wake effects. The wake steering strategies require a proper operation of a wind turbine generator (WTG) under yawed conditions, where the wind turbines are not necessarily aligned in the wind direction.

In the conventional control, the wind turbine is not subjected to any misalignment and adjusted based on aerodynamic properties and other characteristics of the wind turbine, such as mechanical and electrical efficiencies, rotor size, etc. In particular, a target pitch angle $\beta$ is selected from a lookup-table in an open loop control as that angle which provides the maximum power coefficient cp for a given, incoming wind speed U and a given rotor speed (=hub rotational speed) $\omega rot$, i.e. the target pitch angle $\beta$ is determined by a function of the wind speed U and the rotor speed $\omega rot$. A target torque TCtrl of the generator is also determined as a function that depends on the rotor speed $\omega rot$ and on other characteristics of the wind turbine.

Following both pitch and torque control laws, the operational point of the wind turbine converges to an optimum, whenever all assumptions are met. It is the aim of the controller to perform as optimum as possible under a rated power. The conventional controller is adjusted based on a model of the wind turbine which is aligned with the wind direction, and the conventional controller is designed for an optimum operational point under normal operation. However, if some wind turbines (for example in a wind farm) have a (desired) yaw misalignment, for example to avoid wake effects, the wind turbine does not operate in an optimum operational point. The wind turbine can also be subjected to a (desired) yaw misalignment due to reasons other than avoiding wake effects.

SUMMARY

An aspect relates to provide a system comprising a wind turbine and a first control device which controls the wind turbine, which system can improve the annual energy production (AEP). An aspect also relates to provide a wind farm comprising the system, where a plurality of adjacent wind turbines is provided, and a method of controlling a wind turbine, which can improve the annual energy production (AEP).

According to a first aspect of embodiments of the invention, a system comprising a wind turbine and a first control device. The wind turbine comprises a tower; a nacelle being mounted rotatable relative to the tower around a yaw axis so that the nacelle is orientated in an actual yaw angle; a hub being mounted rotatable relative to the nacelle around a rotational axis; at least one blade mounted to the hub; and a generator arranged in the nacelle and comprising an electromagnetic rotor connected to the hub, wherein the generator is configured to convert a rotational energy from the electromagnetic rotor into an electrical energy. The first control device is configured to acquire a yaw misalignment of the wind turbine, which yaw misalignment is a difference between the actual yaw angle and a wind direction at the wind turbine; and to determine at least one of a target pitch angle of the blade and a target torque of the generator based on the yaw misalignment to optimize a power output from the wind turbine.

Advantageously, the WTG is optimally operated in yawed conditions, loses only a minimum of energy yield in yawed conditions, makes the wind turbine control under wake steering more efficient and achieves higher wind farm energy yield. The performance of the wind farm will be increased by this improved WTG control with better and efficient performance at substantially no extra costs. For example, the first control device can be upgraded or retrofitted in existing wind turbines or wind farms.

In an embodiment, the first control device is configured to determine the at least one of the target pitch angles of the blade and the target torque of the generator by calculating the target pitch angle of the blade as a function of an incoming wind speed, a rotor speed of the hub and the yaw misalignment, and by calculating the target torque as a function of the rotor speed and the yaw misalignment.

Compared to a conventional control, which disregards any yaw misalignment compensation, embodiments of the present invention take a change of the aerodynamic behaviour in a misaligned operation of the hub into account. The efficiency of the wind turbine is thus optimized. The pitch angle can be controlled in an open loop by taking the yaw misalignment into account, as the aerodynamic behaviour of the hub is different than in a normal aligned operation.

In an embodiment, the first control device is configured to determine the at least one of the target pitch angle of the blade and the target torque of the generator by considering a lookup-table, in which a relation between the incoming wind speed, the rotor speed of the hub and the yaw misalignment, and/or a relation between the target torque and the rotor speed and the yaw misalignment are stored.

In an embodiment, the first control device is either integrated in the wind turbine or a remote-control device. The remote-control device is connected to the wind turbine in a wireless manner.

In an embodiment, the first control device is configured to determine the at least one of the target pitch angles of the blade and the target torque of the generator such that a tip-speed ratio is set, at which a power coefficient of the wind turbine becomes an optimum at the given yaw misalignment.

According to a second aspect of embodiments of the invention, a wind farm is provided. The wind farm comprises the system, wherein a plurality of adjacent wind turbines is provided. The wind farm comprises a second control device which is configured to determine the respective actual yaw angles of the plurality of adjacent wind turbines based on wake conditions between the plurality of adjacent wind turbines.

In an embodiment, the second control device which is configured to determine the respective actual yaw angles of the plurality of adjacent wind turbines based on the wake conditions between the plurality of adjacent wind turbines such that a total power output of the wind farm becomes an optimum.

In an embodiment, the first and second control devices are either integrated as a unit or separate control devices.

According to a third aspect of embodiments of the invention, a method of controlling a wind turbine is provided. The wind turbine comprises a tower; a nacelle being mounted rotatable relative to the tower around a yaw axis so that the nacelle is orientated in an actual yaw angle; a hub being mounted rotatable relative to the nacelle around a rotational axis; at least one blade mounted to the hub; and a generator arranged in the nacelle and comprising an electromagnetic rotor connected to the hub, wherein the generator is configured to convert a rotational energy from the electromagnetic rotor into an electrical energy. The method comprises steps of acquiring a yaw misalignment of the wind turbine, which yaw misalignment is a difference between the actual yaw angle and a wind direction at the wind turbine; and determining at least one of a target pitch angle of the blade and a target torque of the generator based on the yaw misalignment to optimize a power output from the wind turbine.

In an embodiment, the at least one of the target pitch angles of the blade and the target torque of the generator is determined by calculating the target pitch angle of the blade as a function of an incoming wind speed, a rotor speed of the hub and the yaw misalignment, and by calculating the target torque as a function of the rotor speed and the yaw misalignment.

In an embodiment, the at least one of the target pitch angles of the blade and the target torque of the generator is determined by considering a lookup-table, in which a relation between the incoming wind speed, the rotor speed of the hub and the yaw misalignment, and a relation between the target torque and the rotor speed and the yaw misalignment are stored.

In an embodiment, the at least one of the target pitch angles of the blade and the target torque of the generator is determined such that a tip-speed ratio is set, at which a power coefficient of the wind turbine becomes an optimum at the given yaw misalignment.

In an embodiment, a plurality of adjacent wind turbines is provided, and the respective actual yaw angles of the plurality of adjacent wind turbines are controlled based on wake conditions between the plurality of adjacent wind turbines.

In an embodiment, the respective actual yaw angles of the plurality of adjacent wind turbines are controlled based on the wake conditions between the plurality of adjacent wind turbines such that a total power output of the wind farm becomes an optimum.

BRIEF DESCRIPTION

Some of the embodiments will be described in detail, with reference to the following figures, wherein like designations denote like members, wherein.

DETAILED DESCRIPTION

Figure 1:
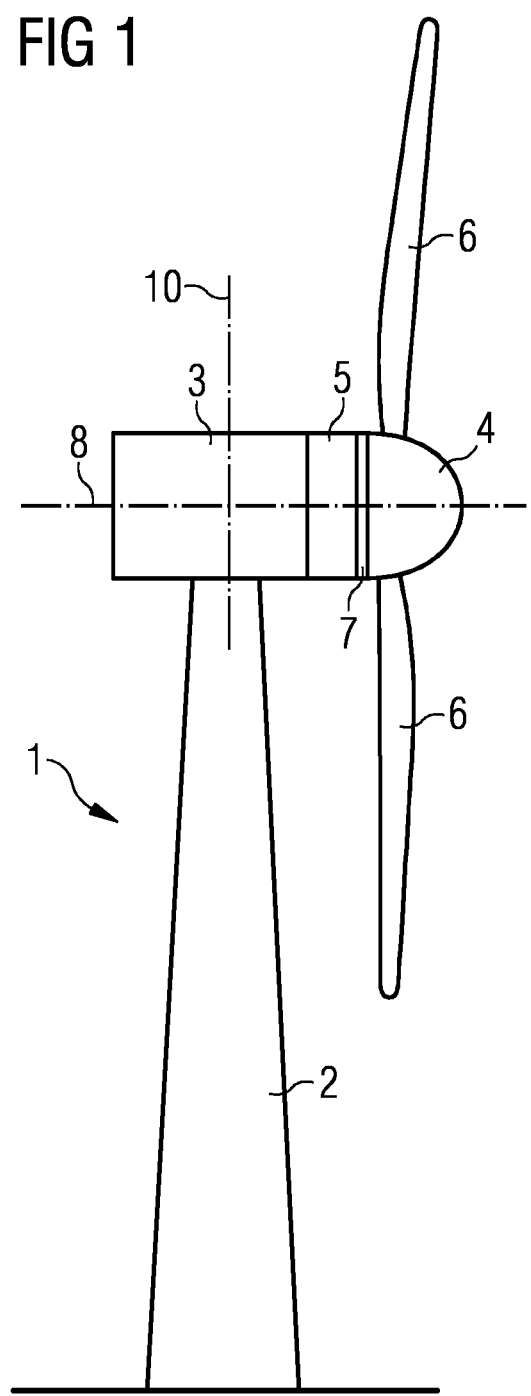
FIG. 1 shows a wind turbine and the different elements thereof.

The illustrations in the drawings are schematic. It is noted that in different figures, similar or identical elements are provided with the same reference signs.

FIG. 1 shows a wind turbine 1. The wind turbine 1 comprises a nacelle 3 and a tower 2. The nacelle 3 is mounted at the top of the tower 2. The nacelle 3 is mounted rotatable relative to the tower 2 around a yaw axis 10 by means of a yaw bearing.

The wind turbine 1 also comprises a hub 4 with three rotor blades 6 (of which two rotor blades 6 are depicted in FIG. 1). The hub 4 is mounted rotatable relative to the nacelle 3 by means of a main bearing 7. The hub 4 is mounted rotatable about a rotor axis of rotation 8.

The wind turbine 1 furthermore comprises a generator 5. The generator 5 in turn comprises an electromagnetic rotor connecting the generator 5 with the hub 4. If the hub 4 is connected directly to the generator 5, the wind turbine 1 is referred to as a gearless, direct-driven wind turbine. Such a generator 5 is referred as direct drive generator 5. As an alternative, the hub 4 may also be connected to the generator 5 via a gear box 9 (see FIG. 2). This type of wind turbine 1 is referred to as a geared wind turbine. Embodiments of the present invention is suitable for both types of wind turbines 1.

The generator 5 is accommodated within the nacelle 3. The generator 5 is arranged and prepared for converting the rotational energy from the hub 4 into electrical energy in the shape of an AC power.

An operation of the wind turbine 1 is controlled by a first control device (not shown). The first control device can be either integrated in the wind turbine 1 or a remote-control device. For example, the first control device as a remote-control device can be configured to control a plurality of adjacent wind turbines 1 of a wind farm. The remote-control device is connected to the wind turbines 1 of the wind farm in a wireless manner.

Figure 2:
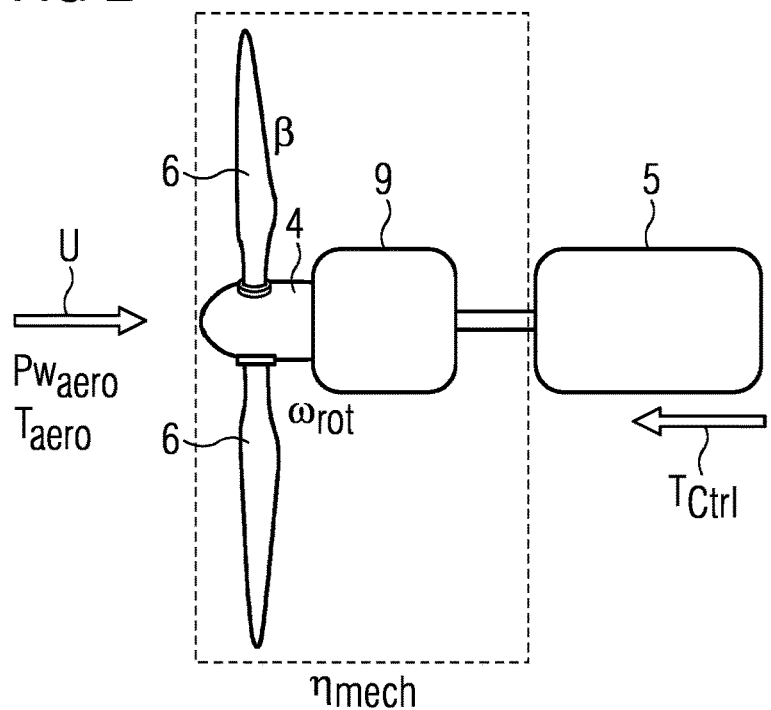
FIG. 2 shows a schematic configuration of a wind-turbine-generator-system (WTG system) according to an embodiment.

FIG. 2 shows a schematic configuration of a wind-turbine-generator-system (WTG) according to an embodiment. The wind having a wind speed U drives the blades 6 and the hub 4 which is connected to the electromagnetic rotor of the generator 5 via a gearbox 9. The hub 4 rotates with a rotor speed $\omega_{rot}$. The blades 6 are adjusted to have a (common) target pitch angle β which is an orientation of the blades 6 around the longitudinal axes of the respective blades 6. The wind rotates the hub 4 by an aerodynamic power Pwareo and an aerodynamic torque Taero. The first control device determines a set point of the target torque TCtrl of the generator 5. A mechanical efficiency of a system consisting of the blades 6, the hub 4 and the gearbox 9 is designated by reference sign ηmech.

The first control device is configured to acquire a yaw misalignment γ of the wind turbine 1, which yaw misalignment γ is a difference between an actual yaw angle of the nacelle 3 and the hub 4, and a wind direction at the wind turbine 1. The first control device can either be configured to directly measure the wind direction or to receive information about the wind direction from a remote device (for example from a second control device for controlling a plurality of wind turbines 1 in a wind farm).

The first control device is further configured to determine at least one of a target pitch angle β of the blade 6 and the target torque TCtrl of the generator 5 based on the yaw misalignment γ to optimize a power output from the wind turbine 1. For example, the first control device can be configured to determine the at least one of the target pitch angle β of the blade 6 and the target torque TCtrl of the generator 5 based on the yaw misalignment γ to maximize a power output from the wind turbine 1. The power output of the wind turbine 1 is the output amount of electrical energy per unit time. In detail, the first control device is configured to determine the at least one of the target pitch angle β of the blade 6 and the target torque TCtrl of the generator 5 by calculating the target pitch angle β of the blade 6 as a function of the incoming wind speed U, the rotor speed ωrot of the bub 4 and the yaw misalignment γ, and by calculating the target torque TCtrl as a function of the rotor speed ωrot and the yaw misalignment γ. For example, the target torque TCtrl can be calculated like TCtrl=f(ωrot)*X(γ).

The first control device can be configured to determine the at least one of the target pitch angle β of the blade 6 and the target torque TCtrl of the generator 5 by considering a lookup-table, in which a relation between the incoming wind speed U, the rotor speed ωrot of the hub 4 and the yaw misalignment γ, and/or a relation between the target torque TCtrl and the rotor speed ωrot and the yaw misalignment γ are stored.

Figure 3:
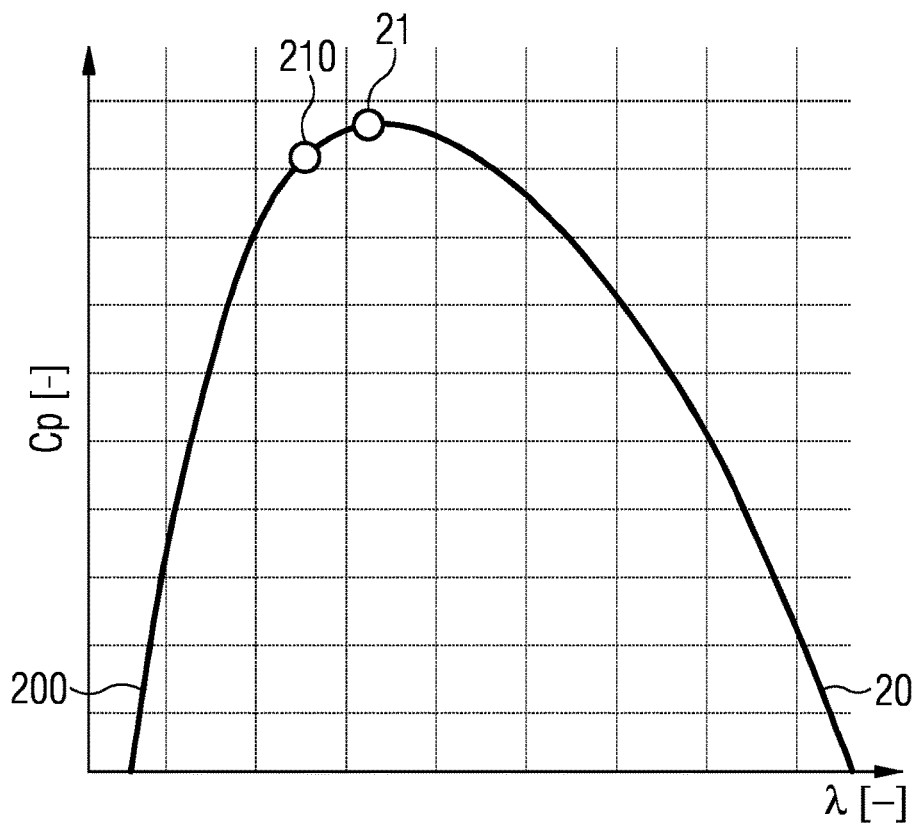
FIG. 3 shows operational points according to an embodiment vis-à-vis the conventional art on a graph of an aerodynamic power coefficient cp against a tip-speed ratio λ.

FIG. 3 shows operational points 21, 210 according to an embodiment vis-à-vis the conventional art on a graphs 20, 200, which represent an aerodynamic power coefficient cp against a tip-speed ratio (TSR) λ, respectively. The tip-speed ratio λ is a ratio between a tangential speed of the tip of a blade 6 and the actual wind speed U. Both graphs 20, 200 are plotted at a given yaw misalignment γ. Reference sign 200 designates a conventional art graph, on which an operational point 210 is set, which does not consider the yaw misalignment γ. Reference sign 20 designates a graph according to an embodiment of the present invention, on which an operational point 21 is set, which considers the yaw misalignment γ. It turns out from FIG. 3 that the operational point 21 of embodiments of the present invention is an optimum operational point, while the operational point 210 of the conventional art is a sub-optimum operational point 21. In other words, the first control device is configured to determine the at least one of the target pitch angle β of the blade 6 and the target torque TCtrl of the generator 5 such that a tip-speed ratio λ is set, at which a power coefficient cp of the wind turbine 1 becomes an optimum at the given yaw misalignment γ.

If the control algorithm would not take the yaw misalignment γ into account, the wind turbine 1 would converge to the sub-optimum operational point 210. However, by taking the yaw misalignment γ into account, the loss of efficiency is removed, and the wind turbine performance is optimized.

In FIG. 3, the graphs 200, 210 of the aerodynamic power coefficient cp against the tip-speed ratio λ are the same for the conventional art and embodiments of the present invention; however, the graphs 200, 210 of the aerodynamic power coefficient cp against the tip-speed ratio λ of conventional art and embodiments of the present invention can be different from each other.

Embodiments of the present invention are particularly useful in controlling the wind farm, where a plurality of adjacent wind turbines 1 is provided. Usually, a wind turbine 1 produces a wake effect to an adjacent, downstream wind turbine 1, which wake effect could impair the output power of the adjacent, downstream wind turbine 1 and thus the efficiency of the entire wind farm. In order to avoid such loss of efficiency, a second control device (not shown) is provided which minimizes the loss of efficiency by minimizing the wake effect. This is achieved by setting a yaw misalignment γ of a specific wind turbine 1 so as to deflect the wake away from other wind turbines 1. The term yaw misalignment γ here relates to a desired difference between the wind direction at the wind turbine 1 and the adjusted actual (and desired) yaw angle. On the one hand, the specific wind turbine 1 will have a reduced output power, but on the other hand, the wake effects to other wind turbines 1 are minimized, which in turn improves the overall efficiency of the entire wind farm.

The second control device is thus configured to determine the respective actual yaw angles of the plurality of adjacent wind turbines 1 based on wake conditions between the plurality of adjacent wind turbines 1. A total power output of the wind farm becomes an optimum. For example, the total power output of the wind farm is maximized.

The first and second control devices can be either integrated as a unit or separate control devices.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system comprising a wind turbine and a first control device, wherein
the wind turbine comprises:
 a tower;
 a nacelle being mounted rotatable relative to the tower around a yaw axis so that the nacelle is orientated in an actual yaw angle;
 a hub being mounted rotatable relative to the nacelle around a rotational axis;
 at least one blade mounted to the hub; and
 a generator arranged in the nacelle and comprising an electromagnetic rotor connected to the hub, wherein the generator is configured to convert a rotational energy from the electromagnetic rotor into an electrical energy; and
the first control device is configured to:
acquire a yaw misalignment of the wind turbine, which yaw misalignment is a difference between the actual yaw angle and a wind direction at the wind turbine; and
determine a target pitch angle of the blade by calculating the target pitch angle of the blade as a function of an incoming wind speed, a rotor speed of the hub and the yaw misalignment to optimize a power output from the wind turbine, or a target torque of the generator based on operating in the yaw misalignment to optimize a power output from the wind turbine, wherein the first control device is configured to determine the at least one of the target pitch angle of the blade and the target torque of the generator such that at a tip-speed ratio is set, at which a power coefficient of the wind turbine is an optimum power coefficient at the given yaw misalignment.

2. The system according to claim 1, wherein the first control device is configured to determine the target torque of the generator by calculating the target torque as a function of the rotor speed and the yaw misalignment.

3. The system according to claim 1, wherein the first control device is either integrated in the wind turbine or a remote control device.

4. A wind farm comprising the system according to claim 1, wherein a plurality of adjacent wind turbines is provided, and the wind farm comprises a second control device which is configured to determine the respective actual yaw angles of the plurality of adjacent wind turbines based on wake conditions between the plurality of adjacent wind turbines.

5. The wind farm according to claim 4, wherein the second control device which is configured to determine the respective actual yaw angles of the plurality of adjacent wind turbines based on the wake conditions between the plurality of adjacent wind turbines such that a total power output of the wind farm becomes an optimum.

6. The wind farm according to claim 4, wherein the first and second control devices are either integrated as a unit or separate control devices.

7. A method of controlling a wind turbine, the wind turbine including a tower; a nacelle being mounted rotatable relative to the tower around a yaw axis so that the nacelle is orientated in an actual yaw angle; a hub being mounted rotatable relative to the nacelle around a rotational axis; at least one blade mounted to the hub; and a generator arranged in the nacelle and comprising an electromagnetic rotor connected to the hub, wherein the generator is configured to convert a rotational energy from the electromagnetic rotor into an electrical energy;

wherein the method comprises steps of:

acquiring a yaw misalignment of the wind turbine, which yaw misalignment is a difference between the actual yaw angle and a wind direction at the wind turbine; and determining a target pitch angle of the blade by calculating the target pitch angle of the blade as a function of an incoming wind speed, a rotor speed of the hub and the yaw misalignment to optimize a power output from the wind turbine, or a target torque of the generator based on operating in the yaw misalignment to optimize a power output from the wind turbine, wherein the at least one of the target pitch angle of the blade and the target torque of the generator is determined such that a tip-speed ratio is set, at which a power coefficient of the wind turbine is an optimum power coefficient at the given yaw misalignment.

8. The method according to claim 7, wherein the target torque of the generator is determined by calculating the target torque as a function of the rotor speed and the yaw misalignment.

9. The method according to claim 7, wherein a plurality of adjacent wind turbines is provided, and the respective actual yaw angles of the plurality of adjacent wind turbines are controlled based on wake conditions between the plurality of adjacent wind turbines.

10. The method according to claim 7, wherein the respective actual yaw angles of the plurality of adjacent wind turbines are controlled based on the wake conditions between the plurality of adjacent wind turbines such that a total power output of the wind farm becomes an optimum.

* * * * *